United States Patent [19]

Thurlo

[11] Patent Number: 5,835,772
[45] Date of Patent: *Nov. 10, 1998

[54] METHOD AND APPARATUS FOR PROVIDING AN INTERFACE BETWEEN A SYSTEM AND A PERIPHERAL DEVICE

[75] Inventor: Clark S. Thurlo, Folsom, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 580,808

[22] Filed: Dec. 29, 1995

[51] Int. Cl.$^6$ ........................................... G06F 9/45
[52] U.S. Cl. .............................................. 395/705
[58] Field of Search .................... 395/701, 705, 395/706, 707, 651, 652; 348/231

[56] References Cited

U.S. PATENT DOCUMENTS

| | | | |
|---|---|---|---|
| 5,265,218 | 11/1993 | Testa et al. | 395/280 |
| 5,319,751 | 6/1994 | Garney | 395/442 |
| 5,404,494 | 4/1995 | Garney | 395/500 |
| 5,412,798 | 5/1995 | Garney | 395/651 |
| 5,504,902 | 4/1996 | McGrath et al. | 395/707 |
| 5,519,851 | 5/1996 | Bender et al. | 395/500 |
| 5,640,204 | 6/1997 | Tsutsui | 348/231 |

OTHER PUBLICATIONS

International Search Report, PCT/US 96/20809, Filing Date Apr. 23, 1997.

*Primary Examiner*—James P. Trammell
*Assistant Examiner*—Peter J. Corcoran, III
*Attorney, Agent, or Firm*—Blakely, Sokoloff, Taylor & Zafman

[57] ABSTRACT

A peripheral device for use in interfacing with a system. The peripheral device contains driver code stored in memory locations within the peripheral device. The driver code is uncompiled, and, when read by a system to which the peripheral device is coupled, enables the system to interface with the peripheral device.

17 Claims, 2 Drawing Sheets

.
.
.

```
PARAMETER_START
  SPEED = 200
  BLOCK = 64K
  DEVICE = 1M
  SIZE = 2M
  WIDTH = 08
PARAMETER_END
```

.
.
.

```
WRITE_START
  PCMCIA_CALL SET VPP = 12V
  PCMCIA_CALL SET VCC = 5V
  offset = 0
  LABEL "BEGIN"
      OUTPUT destination_address + offset, write_command
      OUTPUT destination_address + offset, source_address + offset
      counter = 0
      LABEL "VERIFY"
          COMPARE card_status, write_valid
          IF flag = 1 THEN JUMP "VERIFIED"
          IF counter = 100 THEN JUMP "BEGIN"
          INCREMENT counter
          JUMP VERIFY
          LABEL "VERIFIED"
      INCREMENT offset
      COMPARE offset, number_bytes
      IF flag = 1 THEN JUMP "DONE"
      JUMP "BEGIN"
      LABEL "DONE"
WRITE_END
```

METHOD AND APPARATUS FOR PROVIDING AN INTERFACE BETWEEN A SYSTEM AND A PERIPHERAL DEVICE

FIELD OF THE INVENTION

The present invention relates to peripheral devices of a computer system and more particularly to a method and apparatus for providing a software interface between a system and a peripheral device.

BACKGROUND OF THE INVENTION

A typical computer system comprises one or more processors, control devices, memory, and input/output devices along with the necessary interconnects that allow these devices to communicate with one another. A processor includes, for example, a microprocessor, microcontroller, or other device that is capable of performing mathematical computations. A processor is commonly considered to be the "brain" of a computer system, while the memory and control devices support the processor by providing information storage and organizing the flow of information, respectively, within the system.

A peripheral device is typically a user-installed, optional device that adds additional performance capability to the basic computer system. For example, a disk drive may be thought of as a peripheral device. A disk drive supplements a basic computer system by providing additional memory and a means for long-term storage of information. A modem is a peripheral device that supplements a basic computer system by providing a means for communicating information to a remote location via telephone lines. Basic input and output devices, such as a keyboard and a display screen, are examples of other peripheral devices.

Once a peripheral device is physically coupled to a computer system, generally via an electrical socket that accommodates easy coupling and decoupling, the processor, memory, and other devices of the system gain access to the peripheral device through a series of interlinks called buses. Through these buses, various parts of the system are able to communicate with the peripheral device. This communication, also known as interfacing, involves the exchange of data from one device to another.

For a computer system to interface properly with a peripheral device, both the system and the peripheral device must be speaking the same interface language. This requires that the system be aware of certain parameters of the peripheral device. For example, where the peripheral device is a memory device used for data storage, the system needs to know the amount of data that can be stored in the device so that the system can allocate and more effectively manage the flow of data sent to (written) and taken (read) from the device. The system also needs to know the proper protocol for reading or writing data this data. As another example, if the peripheral device is a modem, the system needs to know the speed at which the modem transmits data, as well as the protocol for sending data to the modem for transmission, so that the system can download data to the modem in a manner in which the modem can accept it.

The software that provides the system with the necessary parameters and enables the system to interface with the peripheral device is called the peripheral device driver, or driver code, or, simply, driver. The source code for a driver is typically written in a high-level language or the processor's assembly language, then compiled into an object code executable file. This executable is stored on a floppy disk that accompanies the peripheral device, and a user installs the compiled driver as an executable in the memory of the computer system to which the peripheral device is to be coupled. The driver may alternatively be stored in the peripheral device itself or come pre-loaded in the computer system in either the operating system or the BIOS. Thereafter, when the peripheral device is accessed, the system uses the executable to enable the interface.

Different drivers are associated with the same type of peripheral device, depending on the make, model, and configuration of the peripheral device, and the make, model, and configuration of the system for which the peripheral device is intended. One reason for multiple drivers is that the executable driver code is compiled in a processor-specific manner. In other words, a peripheral device driver that has been compiled for one type of processor is virtually unreadable by another type of processor. Therefore, a peripheral device having driver code that has been compiled for a type "X" processor can only be used in a computer system comprising a type "X" processor. An essentially identical peripheral device having driver code that has been compiled for a type "Y" processor can only be used in a computer system comprising a type "Y" processor.

As a result, each time a user changes from one type of processor-based system to an incompatible processor-based system, such as when upgrading or concurrently working on systems from two different companies, a new driver needs to be installed to enable interfacing with the same peripheral device. Similarly, when more advanced peripheral devices become available, along with their associated drivers, users working on older processor-based systems may be unable to take advantage these peripheral devices because the older processors may not be able to read the newer drivers that have been compiled for newer processors.

SUMMARY AND OBJECTS OF THE INVENTION

An object of the present invention is to provide a method for interfacing between a system and a peripheral device.

Another object of the present invention is to provide a method by which an interface between a system a peripheral device is processor-independent.

A peripheral device is described for use in interfacing with a system. The peripheral device contains driver code stored in memory locations within the peripheral device. The driver code is uncompiled, and, when read by a system to which the peripheral device is coupled, enables the system to interface with the peripheral device.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which:

FIG. 2 is a sample of interpretive driver code.

DETAILED DESCRIPTION

Figure 1:
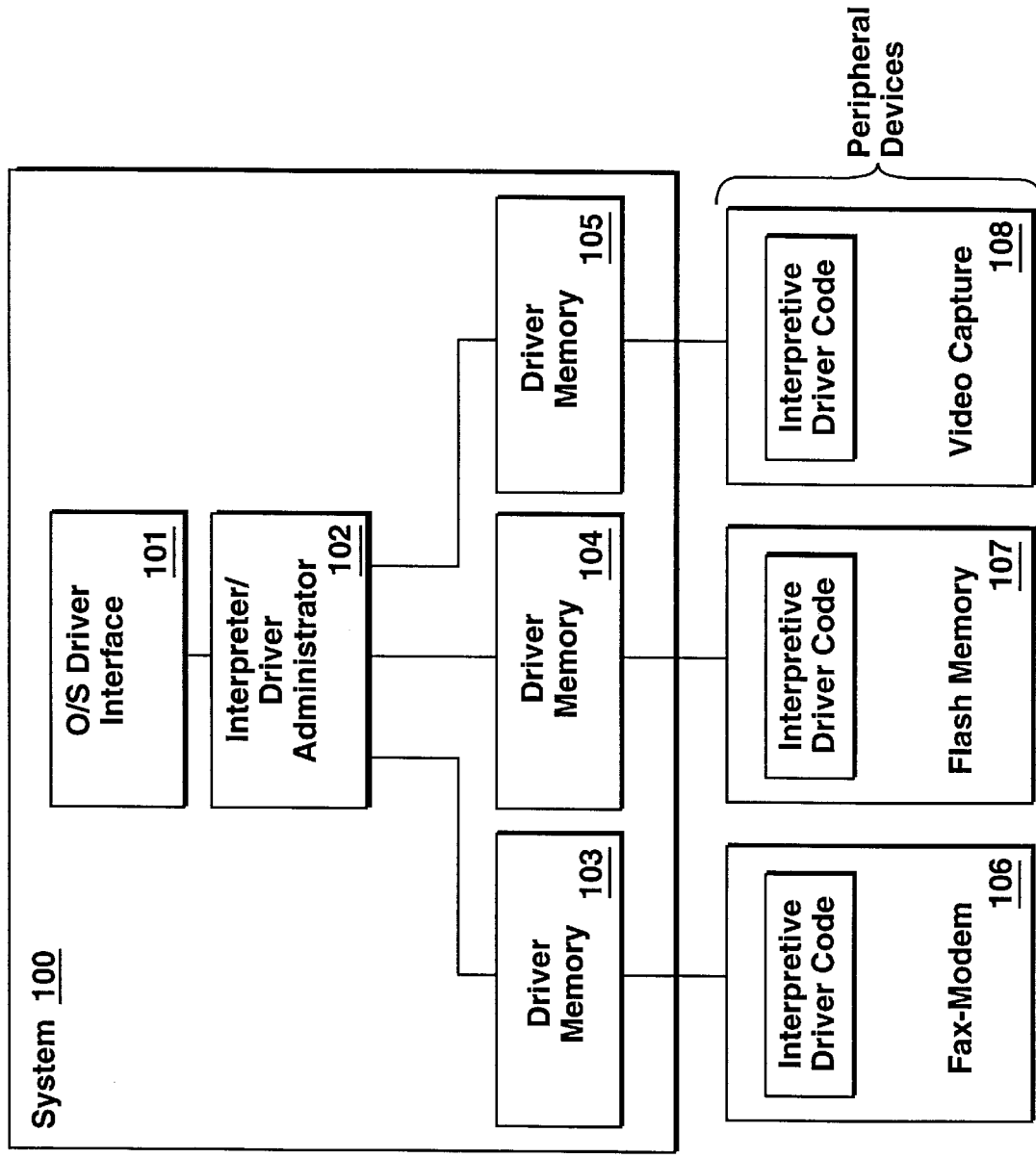
FIG. 1 is a block diagram of a system to which peripheral devices are coupled.

A peripheral device is described along with a method by which driver code is provided that enables the peripheral device to interface with the system to which it is coupled. The peripheral device contains its associated driver code stored in memory locations within the peripheral device. The driver code is uncompiled, meaning that the driver code can be either source code or interpretive code. For the embodiment in which the driver code is source code, the code is first read by the system to which the peripheral device is coupled, and is then stored in memory locations within the system. The system contains an appropriate compiler for compiling the source code into an executable file, which is then executed by the system, thereby enabling the system to interface with the peripheral device.

For the embodiment in which the driver code is interpretive code, the code is first read by the system to which the peripheral device is coupled, and is then stored in memory locations within the system. The system contains an appropriate interpreter for interpreting the source code, thereby enabling the system to interface with the peripheral device. A peripheral device and method of providing an interface between the peripheral device and a system, will be described in more detail below.

FIG. 1 is a block diagram of a system 100 to which peripheral devices 106–108 have been coupled. System 100 comprises an operating system driver interface 101, which is coupled to an interpreter and driver administrator 102, which is coupled to three memory locations (or access thereto) 103–105. Each memory location 103, 104, and 105 interfaces with each of peripheral devices 106, 107, and 108 respectively.

Operating system driver interface 101 provides the interface between the commands initiated by the system user and the peripheral devices. For example, for an embodiment in which peripheral memory cards, such as Personal Computer Memory Card International Association-compliant (PCMCIA) cards, PC or CardBus cards, are to be accessed, the operating system driver interface comprises a file system/media manager and a card services interface. The file system/media manager partitions and manages the memory media by, for example, providing for directory and subdirectory levels for a user, and associating each of these levels to memory locations. The card services interface, based on the memory location indicated by a read or write command initiated by the file system/media manager, determines which of a plurality of peripheral memory cards is being accessed, and passes the command along to the proper technology driver. The system then interfaces with the appropriate memory card through the associated driver to execute the command.

Peripheral device 106 is a fax-modem that is capable of converting data from system 100 into telephone signals for transmitting the data to a remote location. Fax-modem 106 is also capable of transmitting data received via a telephone signal back into the system. Therefore, fax-modem 106, in addition to being coupled to system 100, is also coupled to a telephone line (not shown). Peripheral device 107 is flash memory that provides system 100 with non-volatile, flash memory for storage of data. Peripheral device 108 is a video capture device that digitizes incoming images from a camera and provides the data associated with those images to system 100 for manipulation or storage. For one embodiment of the present invention, system 100 is a desktop or mobile computer system, and peripheral devices 106–108 are compliant with the PCMCIA or CardBus standards. Many of the terms and operations mentioned herein may be found in a standard PCMCIA driver specification.

Each of peripheral devices 106–108 comprises memory locations large enough to store the driver code for the associated peripheral device. As indicated in FIG. 1, within the peripheral device memory of each of peripherals 106–108 is stored its associated driver as interpretive code, which is capable of being interpreted by an interpreter. Also as indicated, the system to which a peripheral device is coupled contains or has access to driver memory locations within the system. The driver code stored in the memory of a peripheral device is read into the system by the driver administrator and stored in the appropriate driver memory location within the system.

The interpretive driver code is stored in protected regions of memory of the associated peripheral device. A protected region of memory is a memory location from which the contents of the memory cannot be readily erased or writtenover, making it difficult to corrupt the interpretive driver code stored in peripheral device memory through normal use and operation of the peripheral device.

System 100, before transferring the interpretive driver code of a peripheral device into system memory, must first be apprised of the basic information needed to load the driver code into driver memory locations 103–105. For example, the driver administrator must know where the driver code resides within the memory of a particular peripheral device. This basic information may be obtained either from predefined memory locations with the peripheral device, or via previously installed set-ups within the system. After the interpretive driver code has been read from the peripheral device and stored in system memory, communication with the peripheral device is primarily conducted in accordance with the software interface established by the driver.

After the proper interpretive driver code, which may be the entire code stored in the peripheral device or some portion thereof, has been transferred from the peripheral device 106–108 to driver memory locations 103–105 within the system, the interpreter in the interpreter/driver administrator 102 of the system interprets the code as needed to interface with the peripheral device. Interpretive code is code that need not be compiled before executing it. BASIC is one example of interpretive code. Interpretive languages are usually generic across various processors. So, for example, a driver written in BASIC for a system comprising processor "X" will also run on a system comprising processor "Y," notwithstanding incompatibilities between processors "X" and "Y," as long as a BASIC interpreter is provided in each system. An interpreter, which may be processor-dependent, is the tool through which an interpretive language is executed.

For an alternate embodiment of the present invention, the peripheral devices coupled to a system contain source code rather than interpretive code as the device driver software. Source code, before being executed, is typically compiled into an object code executable. Therefore, for this embodiment, the system contains (or has access to) a compiler. Upon transferring the source code driver from the peripheral device by reading it into driver memory locations of system memory, the source code is compiled into object code by the compiler, and is stored in system memory as an executable file. The system then executes the file as needed to interface with the peripheral device. Source codes, like interpretive codes, are usually generic across various processors. So, for example, a source code driver written for a system comprising processor "X" will also run on a system comprising processor "Y," notwithstanding incompatibilities between processors "X" and "Y," as long as a compiler, which may be processor-dependent, is provided in each system.

As one example of a useful application in accordance with the present invention, a system, comprising a digital camera, uses flash storage devices, or flash cards, as the film upon which digital images from the digital camera are stored. For one embodiment, each flash card contains its associated driver code stored in an interpretive language in memory within the card. The digital camera comprises an interpreter/driver administrator and memory.

After a picture is taken, the digital camera stores the data associated with the picture into the flash card by calling on the operating system driver interface to write the data into the attached flash card. The driver administrator reads the section of memory within the flash card containing the desired driver code related to write operations, and stores this code in memory within the camera. The camera then proceeds to execute or run this code using the interpreter, thereby enabling an interface between the camera and the flash card, storing the data in the flash card. For an alternate embodiment, the system is an audio recording device which stores digital audio signals in peripheral flash memory. For another embodiment, the system is a personal data assistant (PDA) or cellular phone which uses peripheral devices to perform functions such as storing or displaying data.

As stated above, BASIC is one type of interpretive language. BASIC, however, is a relatively extensive language, resulting in a substantially large interpreter to interpret the language and fairly high computational requirements. In the interest of reducing the size of the interpreter that must be stored in a system, and reducing the load on the processor of the system, a new interpretive language is developed, along with an associated interpreter, which is optimized for the particular application for which the interpretive driver code will be used. In doing so, the size and the processing requirements of the interpreter and the interpretation, respectively, are reduced.

For example, FIG. 2 is a sample of interpretive driver code that has been written in a new interpretive language that has been optimized for flash memory peripherals. Only the lines of code associated parameter settings and the write operation are shown here. A more complete interpretive driver code sequence would additionally include, for example, lines of code associated with the read and erase operations.

The first line of code of FIG. 2, "PARAMETER_START" indicates that this is the section of the code that provides parameter information related to the parameters of the flash card. The line "SPEED=200" indicates that the flash card's access speed is 200 ns. The line "BLOCK=64K" indicates that the block size of the flash card is 64KB. "DEVICE=1M" indicates that the size of the flash devices in the flash card are 1 MB. "SIZE=2M" indicates that the total memory size of the flash card is 2 MB. "WIDTH=08" indicates that this is a x8 card.

The next line of code of FIG. 2, "WRITE_START" indicates that this is the section of the code that provides the protocol for executing a write operation to the flash card. A write command is initiated by the operating system driver interface of the system, in response to, for example, a system user command. The write command is directed to the interpreter/driver administrator in the form of a write request packet comprising 1) the request type (write in this case); 2) the number of bytes to be written (called "number_bytes" in FIG. 2); 3) the destination address of the data (called "destination_address" in FIG. 2 and refers to the flash card in this case); and 4) the source address of the data (called "source_address" in FIG. 2 and usually refers to a buffer in system memory). In response to a write command, the interpreter/driver administrator, if it hasn't already done so, will load either the entire interpretive driver code or only the write portion of the code from the peripheral device into the appropriate driver memory location with the system. The interpreter/driver administrator then locates the "WRITE_START" line in the interpretive drive code within the system, and begins to execute what follows.

In the first two lines of code within the write section, "PCMCIA_CALL SET VPP=12 V" and "PCMCIA_CALL SET VCC=5 V" the code instructs the system to set the appropriate voltage levels to the peripheral device to enable a write to the flash memory. Next, a variable "offset" is set equal to 0. This variable will determine the offset from the original destination and source addresses, provided in the original write request packet, into which the associated data will be written. "LABEL 'BEGIN'" labels this line of the code for reference by subsequent JUMP commands, described below.

"OUTPUT destination_address+offset, write_command" instructs that the data or control commands following the "OUTPUT" command be sent to the flash card. In this case, the destination address sent with the write request packet is offset by the "offset" variable (0 in the first iteration) and is sent a "write_command," which is a flash card-specific command that indicates that the next write to that address contains data to be stored. "OUTPUT destination_address+offset, source_address+offset" instructs that the data stored in the source address, offset by the "offset" variable, is to be stored at the destination address, also offset by the "offset" variable.

Once data has been written in accordance with the two "OUTPUT" commands described above, the system must wait until the flash card is ready to accept another write command before continuing. "counter=0" sets the variable "counter" equal to 0. The "counter" variable is used to pause the system while the flash card completes the previous write operation. "LABEL 'VERIFY'" labels this line of code for subsequent reference by a JUMP command. "COMPARE card_status, write_valid" is a command indicating that if the value of "card_status" is equal to the value of "write_valid," then the variable "flag" will be set equal to 1. Otherwise "flag" will be set equal to 0. "Card_status" is flash card-dependent value that the flash card provides to the system to indicate whether or not the previous OUTPUT command to write data into the flash card executed properly. "Write_valid" is also a flash card-dependent value that is equal to the value the flash card provides to indicate a successful write operation has taken place.

If "card_status" is equal to "write_valid," then the write to the flash card has been successful, and the variable "flag" will be set to 1. Then, in the next line, the interpreter is instructed to jump to the line of code labeled "VERIFIED". If, on the otherhand, "card_status" is not equal to "write_valid," then the write to the flash card has not been successful, and the variable "flag" will be set to 0. The next line of code will warrant no action on the interpreter's part, and the counter will be incremented in the following line of code "INCREMENT counter". The INCREMENT command sets the value of the indicated variable equal to the current value of the variable plus one, thereby incrementing its value by one.

Next the interpreter determines if the counter has reached 100, and if so, the interpreter is instructed to jump back up to the line labeled "BEGIN" so that the data can be rewritten. The higher the value of the variable "counter," the longer the delay. Therefore, the counter limitation in this line of code should be set to a reasonable value by which time data can be written into the flash card. If counter hasn't reached 100 yet, the interpreter is instructed to increment the counter in the next line, and loop back to the label "VERIFY" to continue checking the flash card status.

The variable "offset" is incremented in the command line "INCREMENT offset," and its value is then compared to the total number of bytes, "number_bytes" that the original write request data packed indicated would be written to the flash card. If "offset" is not equal to "number_bytes," thereby setting "flag" to 0, the interpreter is instructed to jump back up to the line of code labeled "BEGIN" so that the remaining bytes can be written into the flash card. Once "offset" reaches "number_bytes," "flag" will be set equal to 1, and the line "If flag=1 THEN JUMP DONE" will instruct the interpreter to skip down two lines to the line labeled "DONE". The following line of code "WRITE_END" indicates to the interpreter that the write to the flash card has been completed. Thus, in this manner, the interpretive driver code, originally resident on the peripheral device, has provided a software interface between the system and peripheral, thereby enabling communication for the execution of a write operation.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of interfacing flash memory a peripheral device to a system, the method comprising the steps of:

reading memory locations within flash memory the peripheral device containing architecture-independent uncompiled driver code;

storing the architecture-independent uncompiled driver code in memory locations within the system; and in response to the system requesting the flash memory peripheral device the perform an operation, performing the operation responsive to performing commands contained in the architecture-independent uncompiled driver code.

2. The method of claim 1, wherein the architecture-independent uncompiled driver code is stored in the flash memory peripheral device as interpretive code, which is interpreted by an interpreter contained within the system to enable the system to interface with the peripheral device.

3. The method of claim 2, further comprising the step of storing digital images in the flash memory peripheral device, wherein the system comprises a digital camera.

4. The method of claim 1, wherein the architecture-independent uncompiled driver code is stored in the flash memory peripheral device as source code, which is compiled and executed by the system to enable the system to interface with the peripheral device.

5. The method of claim 1, further comprising the step of storing digital images in the flash memory peripheral device, wherein the system comprises a digital camera.

6. The method of claim 1, wherein the flash memory peripheral device comprises a fax-modem device.

7. The method of claim 1, wherein the flash memory peripheral device comprises a video capture device.

8. A system comprising:

a system memory;

an interpreter stored in said system memory; and an interface for coupling to any one of a plurality of flash memory devices used for storing digital images, each of said plurality of flash memory devices having stored therein a different architecture-independent uncompiled driver for processing by said interpreter when that flash memory device is coupled to said interface, said system causing the currently coupled one of said plurality of flash memory devices to perform operations by invoking commands specified in the architecture-independent uncompiled driver stored in the currently coupled one of said plurality of different flash memory devices.

9. The system of claim 8, wherein said plurality of different flash memory devices are also used for storing digital audio signals.

10. The system of claim 8, wherein said system is a digital camera or a mass digital image storage system.

11. The system of claim 10, wherein each said architecture-independent uncompiled driver is written in a language that is optimized for storing digital images on flash memory devices.

12. The system of claim 8, wherein the architecture-independent uncompiled driver stored in the currently coupled one of said plurality of flash memory devices is copied into said system memory.

13. A flash memory device comprising:

an interface for coupling to a digital camera;

a flash memory for storing digital images captured by said digital camera; and an architecture-independent uncompiled driver stored in said flash memory, wherein said digital camera causes said flash memory device to store digital images by performing commands in said architecture-independent uncompiled driver by processing said driver with an interpreter.

14. The flash memory device of claim 13, wherein said digital camera causes said flash memory device to store digital audio by performing operations determined by processing said architecture-independent uncompiled driver with the interpreter.

15. The flash memory device of claim 13, wherein said architecture-independent uncompiled driver is written in a language that is optimized for storing digital images on flash memory devices.

16. The flash memory device of claim 13, wherein said architecture-independent uncompiled driver is copied from said flash memory into a system memory of the digital camera.

17. The flash memory device of claim 13, wherein the interface is also for coupling to a plurality of digital cameras that each require a different interpreter, and wherein the interface is also for coupling to a computer.

* * * * *